United States Patent

[11] 3,633,101

[72] Inventors Raymond E. Johnson;
 Abraham Levine, both of Ft. Lauderdale, Fla.
[21] Appl. No. 16,458
[22] Filed Mar. 4, 1970
[45] Patented Jan. 4, 1972
[73] Assignee Data Research Corporation
 Ft. Lauderdale, Fla.

[54] VOLTAGE TRANSIENT MONITOR
 9 Claims, 2 Drawing Figs.

[52] U.S. Cl. .................................................. 324/102,
  324/113, 324/181
[51] Int. Cl. .............................................. G01r 27/28,
  G01r 13/04
[50] Field of Search ......................................... 324/102,
  103, 103 P, 113, 99, 77 A, 181; 328/116, 15, 21,
  22, 58; 307/235, 267

[56] References Cited
UNITED STATES PATENTS

| | | | |
|---|---|---|---|
| 2,752,589 | 6/1956 | De Long, Jr. ................. | 324/103 X |
| 3,054,960 | 9/1962 | Pearlman ..................... | 324/103 X |
| 3,241,065 | 3/1966 | Leah ............................. | 324/99 |
| 3,440,537 | 4/1969 | Warner et al. ................ | 324/99 X |

*Primary Examiner*—Rudolph V. Rolinec
*Assistant Examiner*—Ernest F. Karlsen
*Attorneys*—William D. Hall, Elliott I. Pollock, Fred C. Philpitt, George Vande Sande, Charles F. Steininger and Robert R. Priddy

ABSTRACT: A system is provided for measuring and recording high-speed transients occurring on a powerline or other voltage source, using a relatively slow speed recorder. The transient is quantized into discrete amplitude steps and discrete duration increments. The resulting digital values are then stored, and subsequently displayed on the recorder.

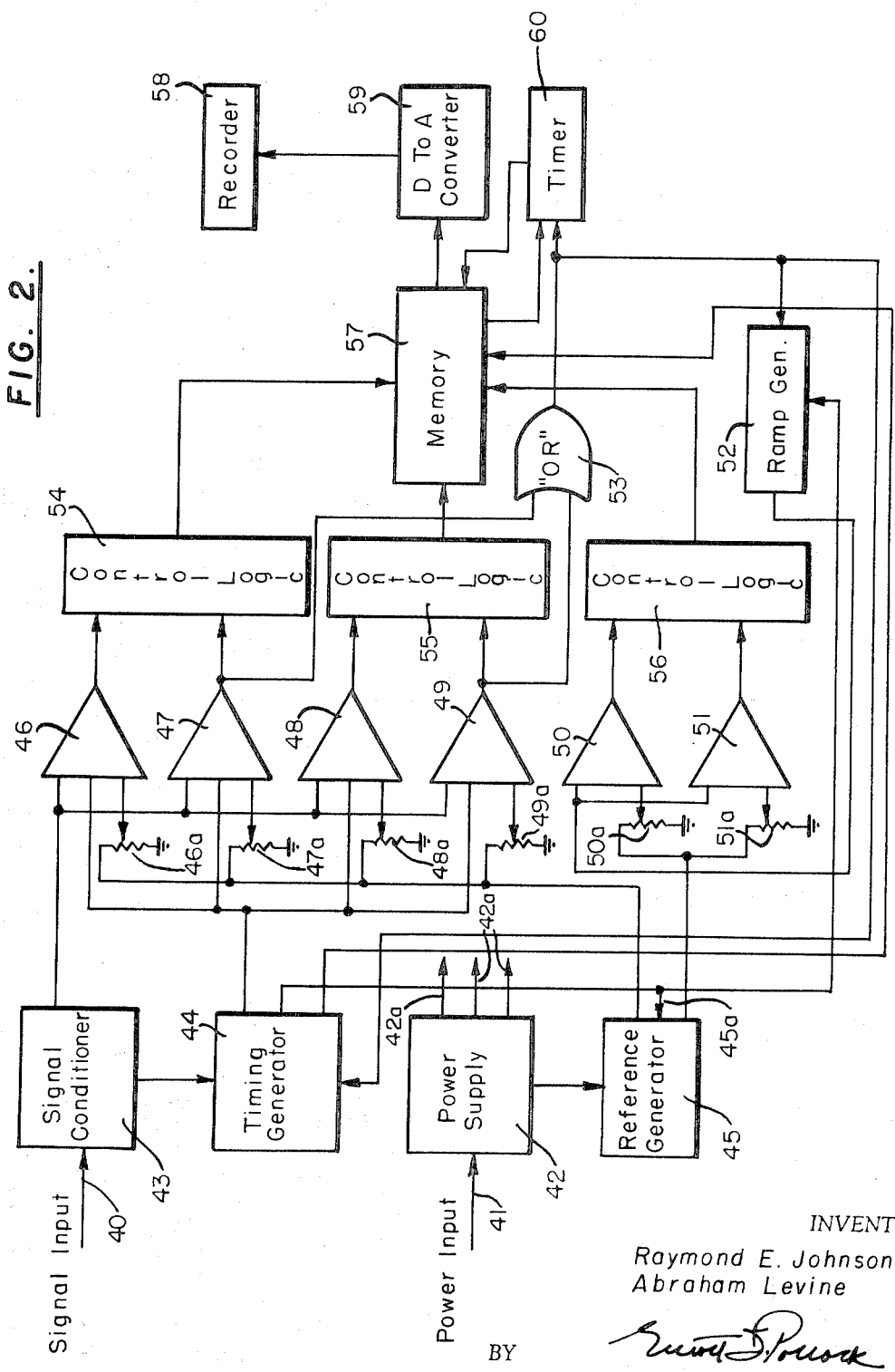

VOLTAGE TRANSIENT MONITOR

BACKGROUND OF THE INVENTION

As is well known, power malfunctions in various types of electrical systems can result in highly undesirable transients. Since the occurrence of such transients, or other undesired voltage variations, can cause significant problems in the operation of an overall system, it is desirable to be able to provide an indication and/or classification of the characteristics of a voltage source, including transients which may occur.

A major problem in monitoring transients involves the fact that the time of occurrence, amplitude, and duration of a transient is normally unpredictable. Moreover, when a transient does occur it is normally of brief duration; and therefore it is entirely possible that occurrence of a transient may not be immediately observable due simply to its fleeting nature. In order, therefore, to properly monitor a transient, an apparatus should be provided which is continually operable to sense predetermined characteristics of a voltage source; and the apparatus employed should preferably include means for indicating just when a transient has occurred, as well as the nature of the transient.

To the extent that efforts have been made in the past to monitor transients, the work done heretofore has concentrated on improving the types of display system or recorder unit to be used in order that short-duration transients can, notwithstanding their brief occurrence, provide a meaningful output indication. To this effect, efforts have been made to improve the sensitivity, speed, or nature of the recording mechanism and/or display mechanism employed, in an effort to better display and/or record the transient itself. Approaches of this type have resulted in complex and costly systems which, nevertheless, have exhibited relatively erratic operation.

The present invention, rather than seeking to record a transient itself, used a different approach for transient monitoring. To this effect, the present invention uses a transient to control a plurality of detectors operative to produce digital signals related to the amplitude and duration of a transient; and these digital signals are stored and subsequently displayed on, or used to control, a conventional relatively low speed recording device. By this approach, the difficulties inherent in trying to record the transient itself are avoided; and major circuit simplification and cost reductions are achieved along with improved reliability in the transient monitoring operation.

SUMMARY OF THE INVENTION

The present invention is concerned with units adapted to continuously monitor a voltage point (power line or other voltage source) and to provide an indication and/or classification of any predetermined characteristics of that source, such as an out-of-tolerance voltage. While the unit is referred to herein as a "voltage" monitor, it will be apparent to those skilled in the art that, by use of a current transformer or shunt, the system also has the capability of monitoring out-of-tolerance current conditions; and accordingly the term "voltage" is intended to voltage-monitoring generic to both current- and voltage-monitoring operations.

The device of the present invention finds application in computer rooms to monitor AC power, thereby to determine when the contents of a computer program might have been altered by a powerline transient. The device can also be used to monitor AC power for automatic machinery such as for the process control for monitoring the sync signal on TV stations to detect dropout of sync; to monitor AC or DC power during acceptance or qualification testing of equipment, so that tests need not be repeated if an out-of-tolerance powerline transient occurs; to monitor lines giving pressure or temperature for alarm conditions; for debugging complex systems having transients on the lines, such as aircraft flight test and missile launches; or for monitoring voltage and/or current conditions at power generating stations.

As will be apparent from the subsequent description, the functions performed by the units of the present invention can be achieved by a variety of different unit configurations. However all of these possible different configurations have the common feature that an input transient, when it occurs, has both its amplitude and duration quantized into discrete increments; and these increments are then stored until the can be displayed by means of a relatively slow speed recorder.

The quantizing operation described above is accomplished, in accordance with the present invention, by means of a plurality of threshold detectors. One group of these detectors is provided for quantizing transient amplitude, and a different group of detectors is provided for quantizing transient duration. Each detector, in both groups, is provided with a reference potential establishing, for that detector, a predetermined operating threshold.

When a transient occurs, it is applied simultaneously to all of the threshold detectors forming the amplitude quantizing portion of the system. Various ones of the amplitude threshold detectors will be operated in dependence upon the actual amplitude of the applied transient; and those threshold detectors which are actually operated in turn drive storage latches, which may take the form of bistable devices, operative to quantize the transient amplitude into digital values. In this way, the transient amplitude is used to produce a digital signal which can be stored for an extended period of time consistent with display on a relatively slow speed recorder. The outputs of the latches or other memory elements employed are used to drive a digital-to-analog converter which in turn feeds a signal to the recorder for purposes of displaying the transient amplitude.

Occurrence of a transient also initiates generation of a linear voltage ramp; and the ramp voltage increases progressively until it is halted by termination of the transient. By this technique, the magnitude achieved by the voltage ramp is directly related to the duration of the transient. The generated ramp is applied to the inputs of the several threshold detectors forming the transient duration monitoring portion of the system, and operates selected ones of these duration threshold detectors in dependence upon the magnitude of the voltage ramp. As in the case of the amplitude quantizing portion of the system, the outputs of the operated duration threshold detectors again drive latches or other appropriate memory elements thereby to convert the transient duration into digital values which may be stored; and the output of this further memory portion of the system in turn drives another digital to analog converter feeding a duration signal to the recorder for display purposes.

The recorder employed can take the from of a two-channel strip chart recorder adapted to display amplitude information in one channel, and duration information in the other channel. Alternatively, the recording unit can comprise a single channel strip recorder with the amplitude and duration information being multiplexed. As will become apparent, moreover, systems constructed in accordance with the present invention may be used to monitor DC voltages or AC voltages; and they may also be employed to monitor positive-going and/or negative-going transients.

DESCRIPTION OF THE DRAWINGS

FIG. 2 is a generalized functional diagram of systems constructed in accordance with the present invention.

DESCRIPTION OF THE PREFERRED EMBODIMENTS

Figure 1:
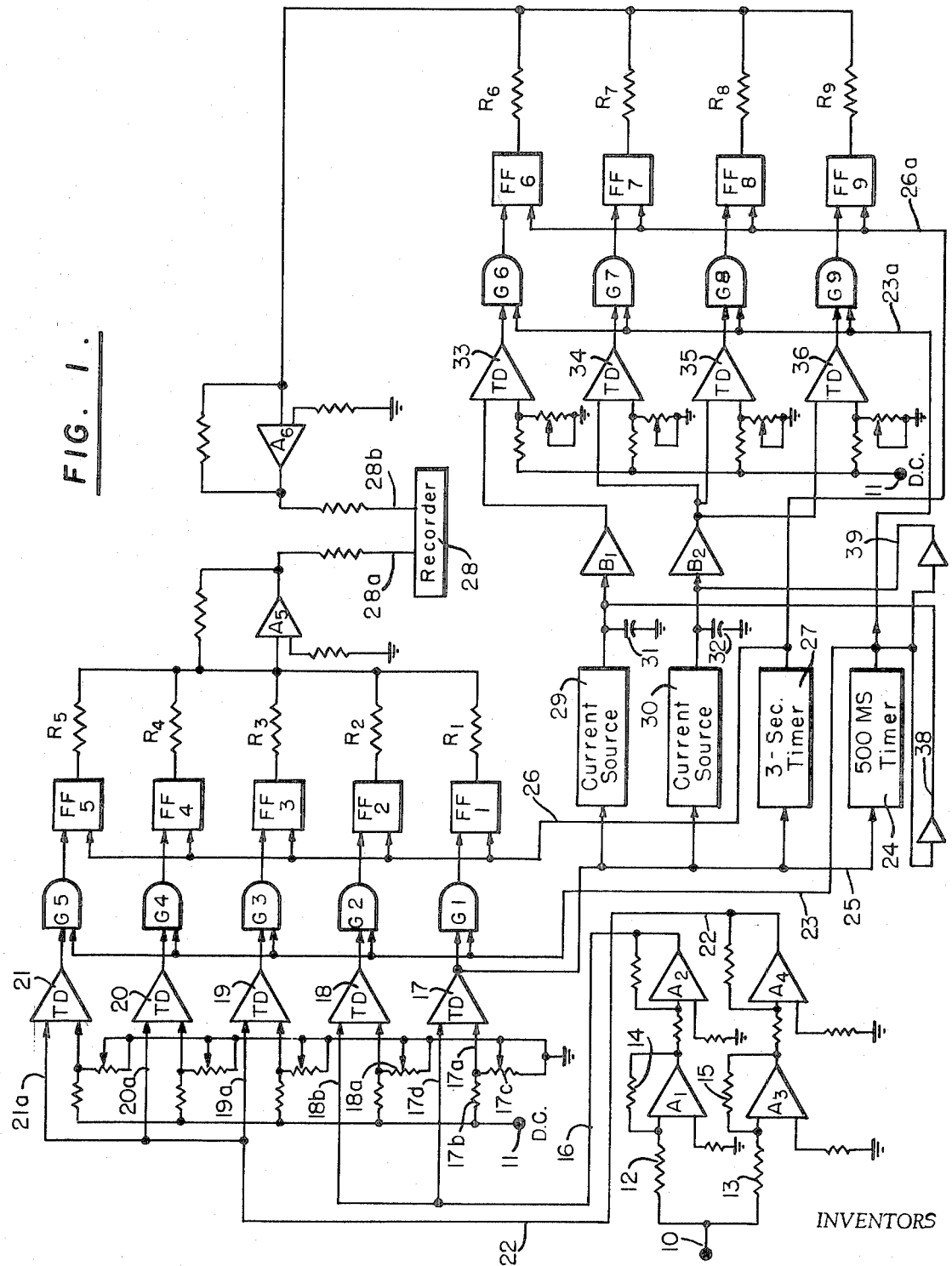
FIG. 1 is a schematic diagram of one form of transient monitor constructed in accordance with the present invention.

FIG. 1 depicts the circuit for a voltage transient recorder constructed in accordance with the present invention; and, for purposes of illustration, the unit will be described with reference to the monitoring of DC voltages. In addition, for purposes of illustration, the unit to be described in reference to FIGS. 1 will be described with reference to the detection of transient levels having voltages greater than or equal to 30 volts, 40 volts, 60 volts, 80 volts, and 100 volts; and for the detection of transient durations of time intervals greater than or equal to 1 millisecond, 50 milliseconds, 100 milliseconds, and 200 milliseconds. It must be emphasized, however, that these particular transient levels and durations are illustrative only; and other voltage levels and durations may be employed.

The voltage being monitored is supplied to an input terminal 10. In addition, a power supply (not shown) will normally be provided for purposes of energizing the various components comprising the circuit of FIG. 1. Actually, the power input to the unit may, if desired, be derived from the same source as the voltage being monitored; and if this type of arrangement is not employed, isolation between the power and monitored voltage inputs can be provided by means of a DC to DC converter so that potential differences between the two voltages may be as much as several hundred volts. In addition, appropriate voltage regulators are provided so that the operating voltages appearing, for example, at terminals such as 11 constitute a regulated DC potential.

The input voltage being monitored, and applied to terminal 10, is applied simultaneously to amplifiers $A_1$ and $A_3$ through resistors 12 and 13. Resistors 12 and 13 provide a high input impedance (e.g., 100K ohms), and also determine the gains of amplifiers $A_1$ and $A_3$ when ratioed with resistors 14 and 15 respectively. Amplifiers $A_1$ and $A_3$ actually have gains less than unity in the particular embodiment to be described because of the range of voltages which is to be accommodated (i.e., a range of 30 volts to 100 volts), so that the gain can be optimized for each set of threshold detectors, to be described. Further amplifiers $A_2$ and $A_4$ are coupled respectively to the outputs of amplifiers $A_1$ and $A_3$, and operate in turn to supply inputs to the several threshold detectors to be described. Amplifiers $A_2$ and $A_4$ are unity gain inverters, and operate to restore polarity of the input signal so that threshold detectors operating above ground can be used.

The output of amplifier $A_2$ is coupled via line 16 to one input each of a pair of threshold detectors 17 and 18. Each detector (as well as the other detectors to be described) comprises a differential amplifier of integrated circuit configuration. Moreover, each detector has one of its differential inputs referenced to a voltage divider to establish an operating threshold level or trip point for the detector in question. Thus, the input 17a of threshold detector 17 is coupled to a voltage divider comprising a resistor 17b and a potentiometer 17c connected between regulated DC source 11 and ground; and potentiometer 17c is so adjusted that threshold detector 17 will trip when a voltage of 30 volts or greater is applied to its other input 17d from the output of amplifier $A_2$. By a similar arrangement comprising a threshold circuit 18a, threshold detector 18 may be caused to trip when the voltage applied to its input 18b, from line 16, equals or exceeds 40 volts.

Amplifier $A_4$ is coupled, via line 22 to the inputs of a further set of threshold detectors comprising detectors 19, 20 and 21. Each of the detectors 19, 20 and 21 is similar in construction and operation to the detectors 17 and 18 already described; and each detector in this further set of detectors includes a threshold circuit on one of its differential inputs so adjusted that threshold detector 19 will trip when a voltage of 60 volts or greater is applied to its other input 19a; detector 20 will trip when a voltage of 80 volts or greater is applied to its other input 20a; and detector 21 will trip when a voltage eof 100 volts or greater is applied to its other input 21a. By this arrangement, therefore, and depending upon the magnitude of the transient which appears at input 10, within the voltage range 30 volts to 100 volts, different ones of detectors 17 through 21 will be tripped or rendered operative.

The outputs of detectors 17 through 21 inclusive are coupled respectively to one input each of gates $G_1$ through $G_5$ inclusive, as illustrated. The second inputs of the several gates $G_1$ through $G_5$ are interconnected to one another and, via line 23, to the output of a 500-millisecond timer 24. Timer 24 is selectively triggered into operation by means of a signal applied via line 25 from the output of threshold detector 17. The operation of this portion of the circuit will be described subsequently.

The output terminals of the several gates $G_1$ through $G_5$ inclusive are coupled respectively to one input each of a plurality of latches $FF_1$ through $FF_5$, comprising bistable circuits. Each latch includes a reset input which is coupled via line 26 to the output of a 3-second timer 27; and the input of 3-second timer 27 is connected to line 25 for operation in response to a signal at the output of threshold detector 17.

The outputs of the several latches $FF_1$ through $FF_5$ are individually coupled via resistors $R_1$ through $R_5$ inclusive and an amplifier $A_5$ to one input 28a of a recorder 28. In the particular embodiment illustrated, recorder 28 is assumed to comprise a two-channel strip chart recorder, and information supplied to its input 28a is recorded in one channel of the recorder as transient magnitude information. Similarly, and as will become apparent, information supplied to its other input 28b, will be recorded on the other channel of said recorder as duration information.

The portion of the circuit thus far described is adapted to monitor the amplitude of a transient. Further elements are provided for monitoring transient duration; but before describing these additional elements, a description of the amplitude-monitoring portion of the system will be given.

So long as the voltage on input terminal 10 is less than 30 volts, none of detectors 17 through 21 will be tripped. For this condition of operation, timers 24 and 27 are "off;" gates $G_1$ through $G_5$ inclusive are all disabled; no setting inputs are applied to any of latches $FF_1$ through $FF_5$; and no input is supplied via 28a to recorder 28. Upon occurrence of a transient at terminal 10 having an amplitude of at least 30 volts, however, the trip point of detector 17 will be exceeded; and the output of detector or voltage comparator 17 will go "high" (in a typical case, it may now go to a voltage equal to or greater than 2.5 volts). The output of detector 17 initiates, via line 25, operation of the 500-millisecond interval timer 24. The output of said timer 24 is coupled via line 23 to an input of each of gates $G_1$ through $G_5$ to enable each gate. The simultaneous occurrence of an output from detector 17 and an enabling input to gate $G_1$ from timer 24 thus permits gate $G_1$ to produce a set input to latch $FF_1$; and latch $FF_1$ is accordingly rendered operative to produce an output via resistor $R_1$.

In effect, for the operation thus far described, the occurrence of a transient having an amplitude of at least 30 volts has operated to set latch $FF_1$ to produce a digital signal or stored indication that a transient of at least 30 volts amplitude has occurred. By a similar sequence of steps, if the transient actually has an amplitude of 40 volts or greater, detector 18 will also be triggered so that both of latches $FF_1$ and $FF_2$ will be set. If the transient amplitude is actually 60 volts or greater, all three detectors 17, 18 and 19 will be tripped, and all three latches $FF_1$, $FF_2$, and $FF_3$ will be set; a transient having an amplitude of at least 80 volts will similarly set latches $FF_1$ through $FF_4$ inclusive; and an input transient having an amplitude of at least 100 volts will set all of latches $FF_1$ through $FF_5$ inclusive. Thus, the input transient is effectively quantized by causing different tones of latches $FF_1$ through $FF_5$ to be set in dependence upon the amplitude of the input transient; and the latches remain in their set condition to store this quantized information for a sufficient time interval to permit the subsequent recording thereof on a relatively slow speed recorder such as 28.

Resistors $R_1$ through $R_5$ inclusive comprise a resistor proportional adder acting, in effect, as a digital to analog converter. The actual signal supplied to input 28a of recorder 28 thus depends upon how many of the several latches $FF_1$ have been set; and this in turn causes the recorder 28 to display transient amplitude information. The output of detector 17, in addition to initiating operation of 500-millisecond timer 24, also initiates operation of a 3-second timer 27. Upon elapse of the 3-second time interval of timer 27, a signal applied via line 26 resets all of latches $FF_1$ through $FF_5$.

Thus, the operation of the system quantities the input transient into discrete amplitude steps, stores this quantized information, and provides a 3-second time interval for the recording of the resultant information, whereafter the unit is automatically reset for the detection and recording of a further transient.

Turning now to the transient duration monitoring portion of the system, it will be seen that the output of detector 17, in addition to performing the functions already described, is coupled to the inputs of a pair of current sources 29 and 30. By this arrangement, sources 29 and 30 are turned "on" whenever the input voltage at terminal 10 is at least 30 volts; and said current sources 29 and 30 are turned "off" whenever the input voltage falls below 30 volts. The outputs of current sources 29 and 30 are coupled respectively to capacitors 31 and 32 and act to charge said capacitors when said current sources are "on." In this way, the amount of voltage charge on capacitor 31 and/or 32 is directly related to the duration of the transient, i.e., the time that the voltage level at terminal 10 was equal to or greater than 30 volts.

Capacitors 31 and 32 drive respectively a pair of buffers $B_1$ and $B_2$ which in turn feed one side of each of four duration comparators or detectors 33 through 36. Each of the detectors 33 through 36 is constructed in a manner similar to that already described with reference to detectors 17 through 21; and, to this effect, each detector includes an input threshold circuit for setting the level at which the detector in question is tripped. The actual settings, and the points at which the detectors 33 through 36 are tripped, are indicative of transient duration inasmuch as the actual magnitude of the voltage applied to the input of said detectors from buffers $B_1$ and $B_2$ is in turn derived from a voltage ramp which was initiated by first occurrence of the transient. The setting of the threshold for detector 33 is such that detector 33 is tripped to its "high" state when a transient equal to or greater than 1 millisecond has occurred. The settings of detectors 34, 35 and 36 are such that said detectors are tripped, respectively, upon occurrence of transients equal to or greater than 50 milliseconds, 100 milliseconds, and 200 milliseconds. Inasmuch as a relatively wide ratio exits between the time base of detector 33, and the time bases of detectors 34, 35 and 36, a separate buffer $B_1$ is provided to drive detector 33, while buffer $B_2$ drives all of detectors 34, 35 and 36.

The outputs of detectors 33 through 36 are connected respectively to gates $G_6$ through $G_9$ which are entirely similar in structure and operation to gates $G_1$ through $G_5$ already described. Similarly, the outputs of gates $G_6$ through $G_9$ are coupled respectively to one input each of latches FF6 through FF9 which correspond in structure and function to latches FF1 through FF5 already described. Gates $G_6$ through $G_9$ are selectively enabled by a signal coupled via line 23a from the output of 500-millisecond timer 24; and latches FF6 through FF9 are eventually reset by a signal applied via line 26a from the output of 3-second timer 27. The operation of these portions of the circuit, and their timing in relation to the portions already described, is therefore identical to that which occurs in the amplitude quantizing portion of the system.

The outputs of flip-flops FF6 through FF9 are fed via a resistor proportional adder $R_6$ through $R_9$ (similar to adder $R_1$–$R_5$ already described), and via an amplifier $A_6$ to the second input 28b of recorder 28 to provide a transient duration input to said recorder.

In operation, occurrence of a transient at terminal 10 (i.e., a voltage of at least 30 volts) operates, via an output signal from detector 17, to turn on current sources 29 and 30 to start charging capacitors 31 and 32. The capacitors continue charging so long as the transient is present, and the capacitor charging is terminated only when the voltage at terminal 10 falls below 30 volts to cause the output from detector 17 to cease and to cause current sources 29 and 30 to go "off." As a result, capacitors 31 and 32 produce voltage ramps the magnitudes of which are a measure of the time duration of the transient.

The capacitor voltages are coupled via buffers $B_1$ and $B_2$ to the inputs of detectors 33 through 36; and different ones of said detectors will accordingly be tripped in dependence upon the magnitude of the capacitor voltages, i.e., upon the time duration of the transient. The outputs of the detectors which have been tripped are coupled respectively via enabled gates $G_6$ through $G_9$ to set appropriate ones of flip-flops FF6 through FF9. By this overall operation, therefore, the transient is quantized into discrete duration increments which are, in effect, stored as digital signals in the group of latches FF6 through FF9. The outputs of the latches FF6 through FF9 operate a digital to analog converter, i.e., proportional adder $R_6$–$R_9$, to provide a duration information signal at 28b which is recorded on the second channel of the two-channel strip chart recorder 28.

The capacitors 31 and 32 are discharged completely at the end of the 500-millisecond sample period provided by timer 24 in order to ready the circuit for occurrence of a next transient. Separate discharge circuits are provided for capacitors 31 and 32, and these have been indicated at 38 and 39 respectively. The 3-millisecond timer 27 operates to reset latches FF6 through FF9, along with latches FF1 through FF5, after elapse of the 3-second interval necessary to display the amplitude and duration information on the strip chart recorder. The 3-second timer 27 also inhibits additional transients from being measured during the 3-second timer interval.

It will be appreciated, of course, that the number of threshold steps employed in both the amplitude and the duration quantizing portions of the system can differ from those described, and that, in addition, the actual quantizing levels can differ from those described. The system may be modified to monitor AC signals instead of DC signals, and/or to monitor negative-going as well as positive-going transients, and/or to record on a signal channel recorder (by use of multiplexing techniques) rather than on a multiple-channel recorder. Other variations can also be made. For example, the recorder can run constantly or, if desired, can be actuated only when a transient has been detected. If desired, audible and/or visible alarms can be provided to indicate that a transient has occurred; and relay closures or other control features may be incorporated to operate external equipment, or to inhibit operations of equipment. In order to illustrate some of these further aspects of the novel system contemplated herein, reference will now be made to FIG. 2 which constitutes a generalized version of the specific circuit already described in reference to FIG. 1.

As illustrated in FIG. 2, and as already described, the general system is adapted to receive both a signal input 40 and a power input 41. The signal input constitutes, of course, the signal being monitored. It may be either an AC or a DC signal, and may or may not be taken from the source supplying power to the unit. Power supply 42 provides the voltage necessary to operate the system and may operate with DC or AC inputs. In the simplest case, input 41 to supply 42 can be a battery.

The input signal 40 should, as a general matter be coupled to a signal conditioner 43. Signal conditioner 43 provides amplification, attenuation, impedance matching, rectification if necessary, or a combination of these functions necessary to meet interface specifications and provide the detection circuitry with a usable signal. If the signal 40 is a DC signal, the signal conditioner 43 may constitute only a resistor network to provide attenuation, or an amplifier to provide gain. If the input signal is AC, the conditioner 43 may include current transformers, amplifiers, and rectifiers operative to convert the AC input into a DC or pulsed DC signal for transient-monitoring and system-timing purposes.

Signal conditioner 43 drives a timing generator 44 which provides a sampling window, and also provides logic timing. In the circuit already described in reference to FIG. 1, the timer 24 provided, in effect, a 500-millisecond sampling window. In the event that AC signals are supplied to input 40, and are converted into pulsating DC by signal conditioner 43, the timing generator 44 can operate to select a specified portion of each halfawave as the sample to be used for amplitude and duration monitoring purposes.

Power supply 42, in addition to supplying voltages necessary to operate the system at 42*l*, drives a reference generator 45 to provide a precision reference or threshold for the several comparators 46 through 51 inclusive. In the system described in reference to FIG. 1, this reference was a regulated DC voltage. However, the reference may constitute a phase-locked AC voltage when AC voltages are being monitored. In this latter form of the invention, the timing signal provided by timing generator 44 is preferably coupled, as at 45*a*, to reference generator 45 to provide synchronization with the input signal.

The threshold detectors 46 through 51 correspond to the circuits already described in reference to FIG. 1, and comprise integrated circuit comparators which produce an output when the input supplied to each comparator equals or exceeds the value of the threshold for that comparator. Various trip voltages can be set up by use of potentiometers 46*a* through 51*a* at the inputs of detectors 46 through 51. In addition, if desired, an optional timing input can be supplied to the comparators 46 through 51 to implement the sampling window.

In the generalized circuit shown in FIG. 2, illustrative comparators 46 and 47 have been assumed to constitute means for quantizing the amplitude of positive-going transients; and these detectors accordingly operate in the manner already described in reference to FIG. 1 to produce output signals when their thresholds are exceeded. The illustrative comparators 48 and 49, in the generalized circuit of FIG. 2, are provided to quantize negative-going transients; and they accordingly produce outputs when their thresholds are not exceeded during the sampling interval. Illustrative comparators 50 and 51 operate to quantize transient duration; and, to that effect, receive an input from a ramp generator 52 in the manner described previously. Ramp generator 52 is turned "on" by an input from either "high voltage" detector 47 or "low-voltage" detector 49 via OR-gate 53.

The first group of detectors 46–47, for monitoring positive-going transients, is coupled to a control logic circuit 54. Similarly, the low voltage group of detectors 48, 49 is coupled to control logic 55; and the duration monitoring group of detectors 50, 51 is coupled to control logic 56. The control logic blocks 54, 55 and 56 provide memory compatible signals which are coupled respectively to memory 57. Memory 57 in turn provides storage of transient amplitude and duration information until it can be displayed on the recorder 58.

The information stored in memory 57 is, as described previously digital; and flip-flop binary elements can accordingly be employed to store this invention. It will be appreciated, however, that other types of digital storage can be used. The output of memory 57 is coupled to a digital to analog converter 59 which provides the DC voltages necessary to operate recorder 58 from the digital information stored in memory 57. A timer 60 can also be provided to control the display interval for the recorder 58; and, if it is desired to display both amplitude and duration information on the same channel, timer 60 can be employed to multiplex the signals to recorder 58.

While we have thus described preferred embodiments of the present invention, many variations will be suggested to those skilled in the art. It must therefore be emphasized that the foregoing description is intended to be illustrative only and not limitative of the invention; and all such variations and modifications as are in accord with the principles described are meant to fall within the scope of the appended claims.

Having thus described our invention, we claim:

1. A transient monitor for measuring high-speed voltage transients occurring at a voltage source and for recording said transients on a slow-speed recorder, comprising input means adapted to be coupled to said voltage source, said input means including reference means for monitoring the magnitudes of voltages supplied by said source to detect occurrence of a transient, amplitude-quantizing means responsive to detection of a transient by said reference means and to the amplitude of said transient for producing first digital signals related to the amplitude of said transient, duration-quantizing means coupled to said input means and responsive to detection of a transient by said reference means and to the duration of said transient for producing second digital signals related to the duration of said transient, memory means for storing said first and second digital signals, means coupled to said memory means for converting said stored first and second digital signals into analog signals related respectively to the amplitude and duration of said transient, and means supplying said analog signals to a slow-speed analog recorder means for displaying information related to the amplitude and duration of said transient.

2. The monitor of claim 1 wherein said reference means comprises a plurality of voltage detectors, and means establishing differing operating thresholds for differing ones of said detectors whereby selected different ones of said detectors are rendered operative in dependence upon the amplitude of said transient.

3. The monitor of claim 2 wherein said amplitude-quantizing means includes a plurality of bistable devices coupled respectively to said plurality of detectors.

4. The monitor of claim 1 wherein said duration-quantizing means includes means for initiating generation of a linear ramp voltage upon commencement of said transient and for terminating generation of said ramp voltage upon cessation of said transient, and means responsive to the terminated magnitude of said ramp voltage for producing said second digital signals.

5. The monitor of claim 4 wherein said means responsive to the magnitude of said ramp voltage comprises a plurality of voltage detectors, said ramp voltage being supplied to the inputs of all of said plurality of detectors, and means establishing differing operating thresholds for differing ones of said detectors whereby selected different ones of said detectors are rendered operative in dependence upon the duration of said transient.

6. The monitor of claim 4 wherein said linear ramp voltage is generated by a current source having capacitor means coupled thereto.

7. The monitor of claim 1 including timer means operable to clear said stored first and second digital signals from said memory means at a predetermined time interval subsequent to detection of the occurrence of said transient.

8. The monitor of claim 1 wherein alternating current voltages are supplied by said source, said input means comprising means for rectifying the voltages being monitored, and means coupling said rectified voltages to said reference means.

9. The monitor of claim 1 wherein said recorder means comprises a two-channel recorder, said amplitude and duration information being displayed respectively on separate channels of said recorder.

* * * * *